(No Model.) 3 Sheets—Sheet 3.
M. MACDOUGALL.
SCREW CUTTING MACHINE.
No. 502,675. Patented Aug. 1, 1893.
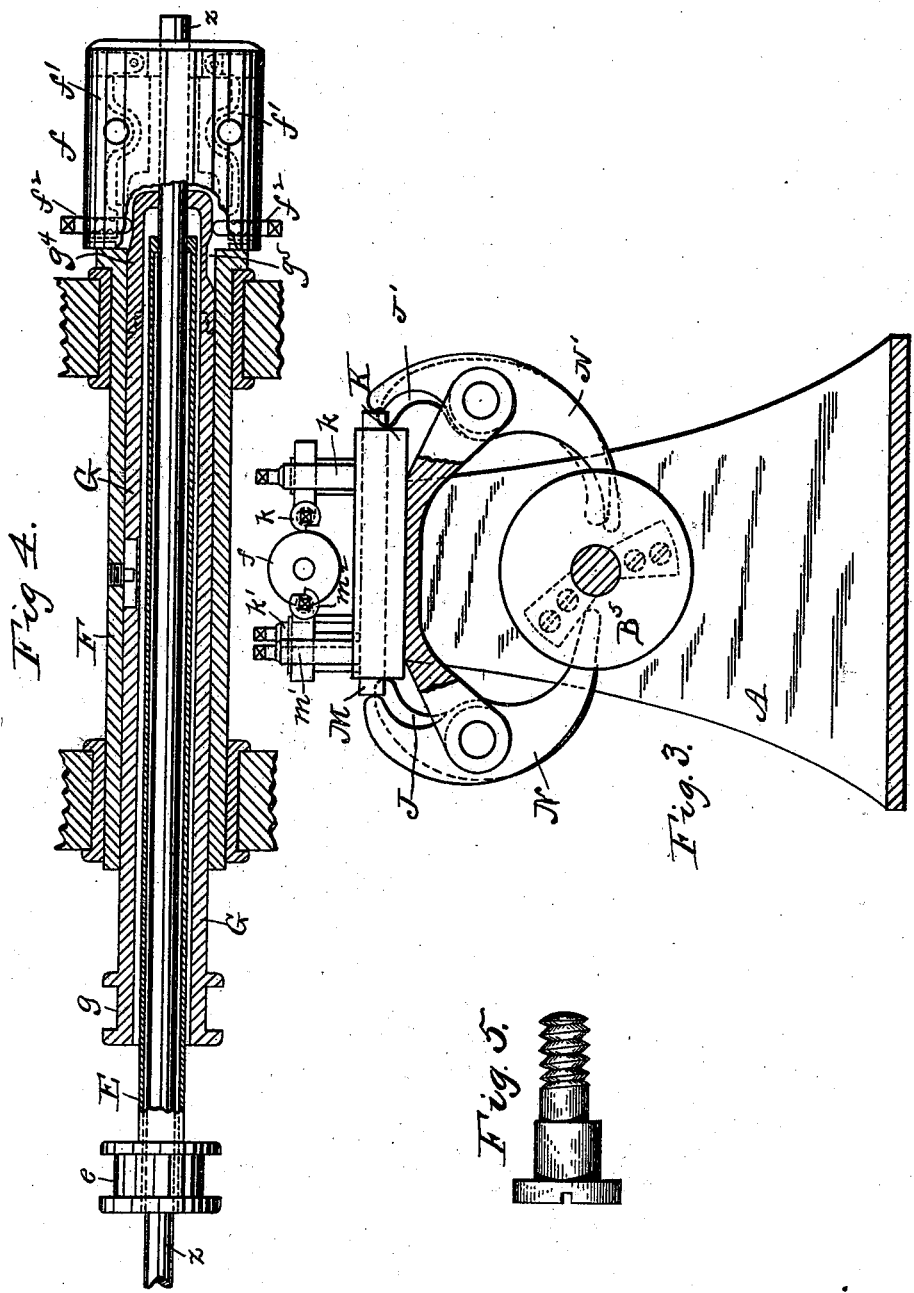
WITNESSES:
C. M. Sweeney
O. A. Cushman
INVENTOR:
Matthew Macdougall
BY Macleod, Calvert & Randall
ATTORNEYS.

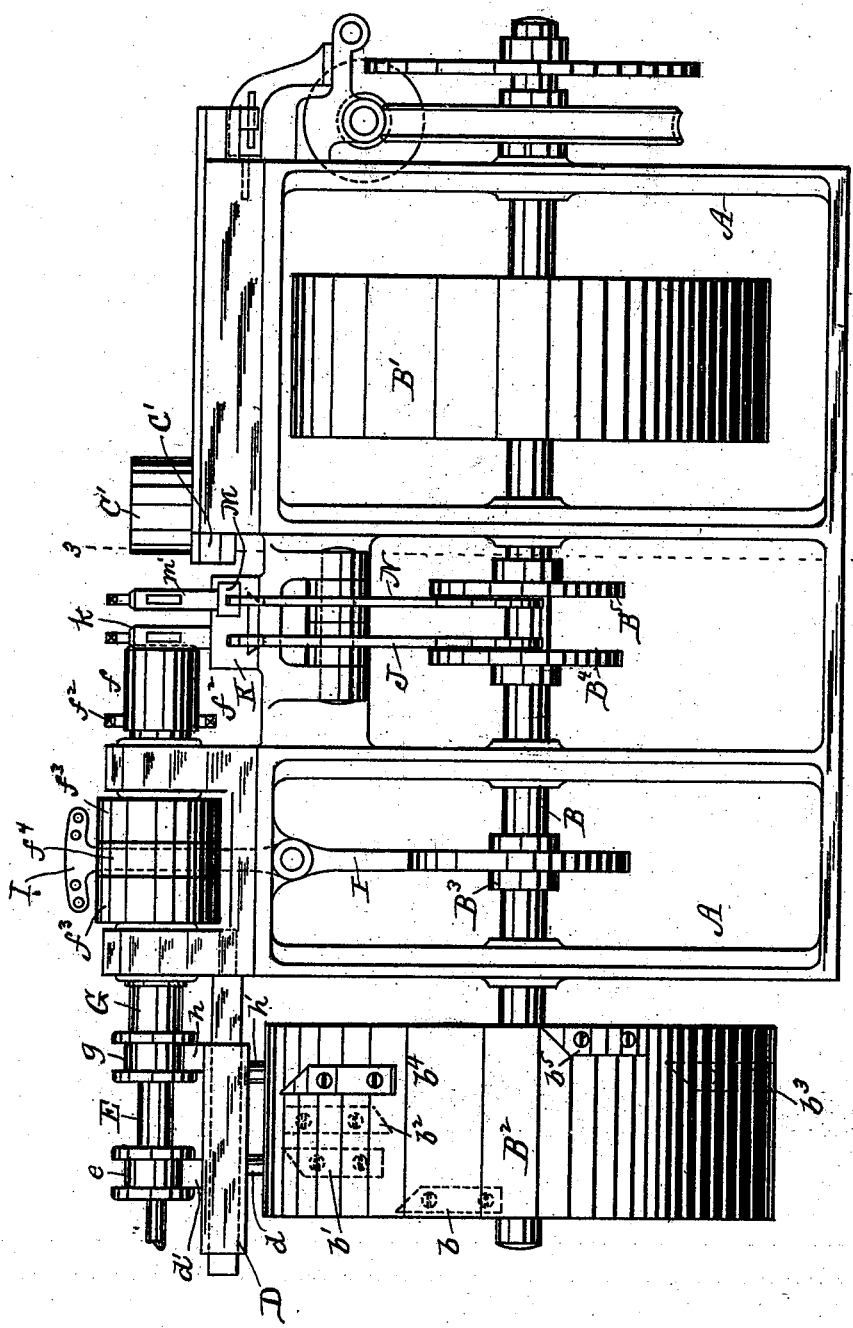

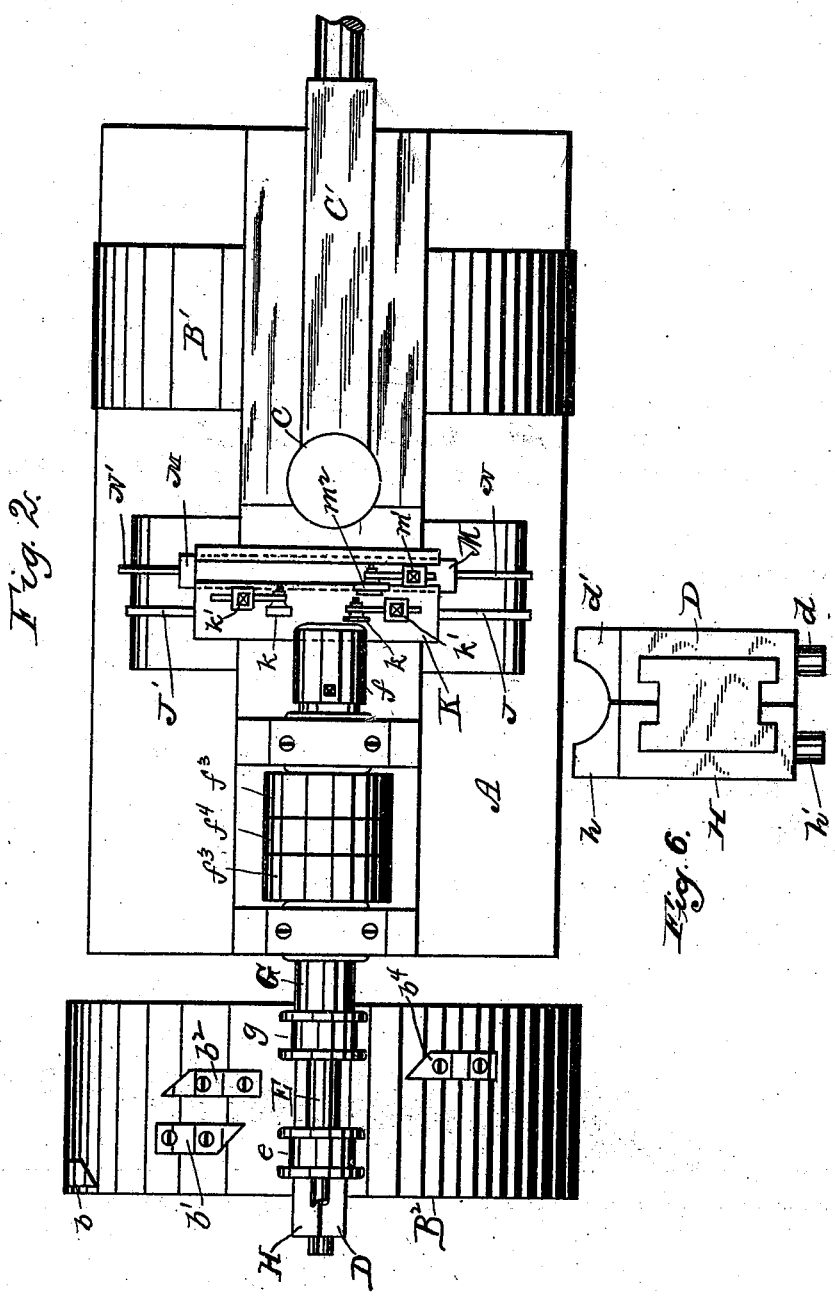

UNITED STATES PATENT OFFICE.

MATTHEW MACDOUGALL, OF ELIZABETH, NEW JERSEY, ASSIGNOR TO THE SINGER MANUFACTURING COMPANY OF NEW JERSEY.

SCREW-CUTTING MACHINE.

SPECIFICATION forming part of Letters Patent No. 502,675, dated August 1, 1893.

Application filed May 31, 1892. Serial No. 435,012. (No model.)

*To all whom it may concern:*

Be it known that I, MATTHEW MACDOUGALL, a citizen of the United States, residing at Elizabeth, in the county of Union and State of New Jersey, have invented certain new and useful Improvements in Screw-Cutting Machines, of which the following is a specification, reference being had therein to the accompanying drawings.

My invention has for its object to provide an automatic screw cutting machine for making metal screws with eccentric shoulders or shanks. Screws of this character are used in sewing or other machines for the purpose of forming the connections of pitmen, links or other parts; and the eccentric shanks or portions afford means for slight adjustment which is effected by turning the screws. Heretofore the eccentric shoulders or portions of these screws have been formed at a separate operation from that of cutting or forming the concentric portions thereof, and the manufacture of these screws in this manner has therefore necessarily been slow and expensive, the re-chucking of the screws for the separate operations requiring considerable time and labor; but by my automatic machine these special screws may be made nearly as rapidly as plain screws.

In carrying my invention into effect I have embodied my improvements in a well-known type of screw-cutting machine (known as the "Hartford screw machine") so that with but slight changes the old form of machine is adapted to produce the new result. These changes consist in providing the sleeve or hollow spindle, which operates the jaws of the chuck, with an eccentric portion which, at the proper moment, causes the said jaws to shift the partly formed blank, before it is severed from the stock, slightly to one side of the position in which it is held while the concentric parts of the screw are being formed, and while the blank is thus held eccentric a cutting tool, carried by a supplemental tool-holder mounted on a supplemental slide, is advanced to cut the eccentric shank or portion of the screw. To bring the chuck-operating sleeve or spindle into position to cause its eccentric part to engage the screws or abutting projections on the tails of the chuck jaw levers, the cam or tappet wheel which operates the slides for moving the stock-feeding and chuck-operating spindles is provided with additional cams or tappets which impart additional sliding or endwise movements to the chuck-operating spindle to cause the screw-blank to be shifted to an eccentric and then to be returned to a concentric position, all as will be hereinafter more fully set forth.

In the accompanying drawings Figure 1 is a side elevation of a screw-cutting machine embodying my invention. Fig. 2 is a partial plan view of the same. Fig. 3 is a cross-section on line 3—3 of Fig. 1, and Fig. 4 is a detail view of the chuck, its operating spindle and adjacent parts. Fig. 5 shows an eccentric shank screw such as is produced by my invention. Fig. 6 is a detail end view of the slides and their support.

A denotes the frame work of the machine and B the shaft which carries the cam or tappet wheels for operating the several mechanisms of the machine. The wheel B' mounted on the shaft B is, in practice, provided with suitable cams or tappets (not shown) for operating the slide C which carries the turret C'. Mounted on the shaft B is also the wheel $B^2$ carrying suitable cams or tappets $b$ and $b'$ which engage with a pin $d$ formed in a slide D having a projection $d'$ entering a groove $e$ in the rear end of the stock-feeding sleeve E through which the stock or wire $z$, from which the screws are to be made, pass.

Mounted in suitable bearings in the upper part of the frame A is a rotating sleeve F carrying at its forward end a chuck $f$ within which are pivoted the chuck levers $f'$, denoted in dotted lines in Fig. 4. The rotating sleeve F is provided with suitable fast pulleys $f^3$ and with an interposed loose pulley $f^4$, these pulleys being engaged by suitable belts (not shown) which are operated by a belt shifter I receiving its movement from the cam $B^3$ on the shaft B, to rotate the chuck-carrying spindle in opposite directions at the proper times in the usual manner while the screw is being cut and threaded, this spindle-operating mechanism having long been in use in screw machines of the character to which my invention relates.

Within the sleeve F, and attached thereto so as to rotate therewith, but having a longitudinal movement independently thereof, is the sliding chuck-operating sleeve G, the forward end of which is arranged to engage with the screws or projections $f^2$ on the rear end of the chuck levers $f'$, the said sleeve G being provided at its rearward end with a groove $g'$ which is entered by a pin or projection $h$ on the slide H operated by the cams or tappets $b^3 b^4$ on the wheel $B^2$, said cams or tappets being arranged to engage the pin $h'$ of the said slide H.

The forward end of the spindle G, when withdrawn from contact with the screws or projections on the rear ends of the clutch levers releases the jaws of the said levers from their hold on the stock; but when the said spindle is advanced to the position shown in Fig. 4 the stock will be clamped concentric with the spindle F, this being the position in which the stock is held while the head and concentric portions of the screw are being formed. Just rearward of this forward portion of the sleeve or spindle G, which holds the chuck jaws concentric with the spindle F, the said spindle G is provided with an eccentric portion represented by the full part $g^4$ on one side of the said spindle G and a corresponding recess $g^5$ on the opposite side of said spindle so that when the said spindle is shifted farther forward (by the cam or tappet $b^4$) than is represented in Fig. 4 its eccentric portion will engage the screws or projections $f^2$ on the rear ends of the clutch levers and will therefore shift the stock slightly eccentric to the spindle F.

Mounted on the shaft B is a tappet wheel $B^4$ which operates the levers J and J' which in turn actuate the transversely moving slide K which carries the milling and cutting-off tools $k$ mounted on the posts $k'$, these parts being the same as those long in use in this class of machines. In the slide K is mounted a supplemental slide M carrying the post $m'$ which supports the cutting tool $m^2$ which latter cuts or forms the eccentric portion of the screw shank, the said slide M being operated by the levers N and N' actuated by a tappet-wheel $B^5$ on the shaft B.

The operation of my improved machine is as follows: The stock having been passed in through the sleeve or spindle E and the said sleeve or spindle having been moved forward to the position shown in Fig. 4 (to feed the stock forward) through the action of the cam or tappet $b$ and the slide D, (which latter is actuated by said cam or tappet,) the sleeve G is next moved forward by the cam or tappet $b^2$ to the position shown in Fig. 4, thus clamping the chuck-jaws against the stock. Rotary motion is now imparted to the sleeve F carrying the chuck and the milling tool is advanced against the stock, forming the head portion of the screw and the concentric portion of the shank thereof; and when this has been done the cam or tappet $b^4$, acting on the pin $h'$, advances the slide H thus causing the latter to give an additional forward movement to the sleeve G bringing the eccentric portions $g^4 g^5$ thereof into contact with the screws or projections on the rear ends of the clutch levers, and thus shifting the stock slightly eccentric to the position it previously occupied. The supplemental slide M, with its cutting tool, is now advanced, and the eccentric portion of the screw shank is formed thereby, and when this has been done the turret, which carries the threading die, is advanced to thread the shank of the screw in the usual manner. The sleeve G is next retracted to the position shown in Fig. 4 by the cam or tappet $b^5$ and the cutting off tool is then advanced to sever the screw from the stock; and when this has been accomplished the cam or tappet $b^3$ causes the sleeve or spindle G to be retracted until its forward end is clear of the screws or projections on the rear ends of the clutch levers, thereby releasing the stock from the clutch jaws, the sleeve or spindle E having meanwhile been retracted by the cam or tappet $b'$ for a new hold upon the stock; and the cam or tappet $b$ then causes another forward movement of the said sleeve E feeding the stock forward for the formation of a new screw by a repetition of the operation just described.

I claim—

1. In a screw-threading machine, the combination with a rotating stock-holding and clutch-carrying sleeve, a screw-forming tool-carrier and its actuating mechanism, of an automatic mechanism for shifting the stock held by the jaws of the said clutch eccentric to the rotating clutch-carrying sleeve, at times, and an auxiliary and independently movable cutting tool to form the eccentric shank or portion of the screw.

2. In a screw-threading machine, the combination with a rotating clutch-carrying spindle, of a sliding sleeve within the same serving to operate the clutch jaws and provided near its forward end with an eccentric portion, mechanism for giving an additional forward movement to said sleeve, at times to cause the said eccentric portion to operate the clutch to shift the stock eccentric to the clutch carrying sleeve, a slide carrying the usual milling or cutting tool, and a supplemental slide carrying the cutting tool which latter is caused to engage the stock when the latter is shifted eccentrically, to form the eccentric shank portion of the screw.

3. The combination with the rotating clutch-carrying spindle F, and the clutch jaws at the forward end thereof, of the sliding clutch-operating sleeve G rotating with the said sleeve F and provided near its forward end with an eccentric portion, cams or tappets for giving the normal forward and backward movements to the said sleeve G to cause it to clamp and release the clutch jaws, and cams or tappets for giving the said sleeve additional forward and backward movements to bring its eccentric portion in contact with the projections on the clutch-lever, to shift the stock eccentrically at times and to return it to its normal position, a slide carrying the usual cutting tool for forming the concentric portion of the screw shank, a supplemental and independently moving slide carrying a supplemental tool for forming the eccentric portion of the screw shank, and mechanism for operating said slides.

In testimony whereof I affix my signature in presence of two witnesses.

MATTHEW MACDOUGALL.

Witnesses:
 HENRY CALDER,
 J. G. GREENE.